United States Patent Office 3,130,960
Patented Apr. 28, 1964

3,130,960
RECOVERY OF URANIUM BY CARBONATED WATER AND SURFACE ACTION AGENTS AND WETTING AGENTS
James Wellford Martin, Yonkers, N.Y., assignor to Oil Recovery Corporation, New York, N.Y., a corporation of New York
No Drawing. Filed Feb. 8, 1956, Ser. No. 564,140
7 Claims. (Cl. 262—3)

This invention relates to a method of recovering uranium as well as vanadium, thorium, and rare earth minerals often found associated with uranium, from subterranean strata, such as granites and pegmatites, and sedimentary strata such as sands and sandstones, and more particularly from strata such as oil sands where associated with oil or other hydrocarbonaceous deposits, especially where the recovery operations are carried out in situ in the earth.

Small concentrations of uranium and vanadium are commonly present in close proximity to deposits of carbon compounds, and the ash from the burning of oil is a source of uranium. Further it has been found that the produced waters from an oil well during a water flood contain a substantial amount of uranium in solution and that this uranium may be concentrated by filtering the water particularly if a carbonaceous (coal) filter is used. However, this method is unsatisfactory in that it fails to remove a substantial percentage of the uranium and/or vanadium present. Nor were such operations controllable to increase desired mineral content of the waters.

Among the objects of the present invention are methods by which a larger percentage of uranium and/or vanadium compounds and/or thorium and/or rare earth minerals and other fissionable elements may be removed and recovered from subterranean strata by the utilization of carbonated water introduced into or forced through the strata under substantial pressure.

Other objects include the recovery of the uranium and/or vanadium values and/or thorium and/or rare earth minerals by such processes carried out in situ in the earth in the presence of hydrocarbonaceous substances, either introduced with the carbonated water or obtained by action of the carbonated water on contiguous strata containing petroleum or other hydrocarbonaceous deposits.

Further objects include the products recovered by the methods referred to above.

Other objects include the introduction of wetting agents and surface active agents into the oil-bearing strata in the presence of carbonated water, under pressure, whereby a greater percentage of said uranium and/or vanadium compounds and/or thorium and/or rare earth minerals may be recovered than was possible heretofore.

Still further objects and advantages of the present invention will appear from the more detailed description set forth below, it being understood that such more detailed description is given by way of illustration and explanation only, and not by way of limitation, since various changes therein may be made by those skilled in the art, without departing from the scope and spirit of the present invention.

In accordance with the present invention, it has been found that carbonated water under pressure introduced into a subterranean formation containing uranium and/or vanadium compounds and/or thorium and/or rare earth minerals will effect recovery of uranium and/or vanadium and/or thorium and/or rare earth salts from said strata in amounts greater than has heretofore been possible. The carbonated water under pressure renders the desired mineral constituents, such as uranium and/or vanadium and/or thorium and/or rare earth compounds soluble so that greater concentrations of such desired mineral constituents may be obtained. The solutions produced are desirably conducted to the surface and may be treated for recovery of the desired mineral content in a plant either in proximity to the area mined, or the solutions may be shipped substantial distances to a center for such treatment. Thus the present invention provides an improved process for recovery of uranium, vanadium and/or other mineral values including thorium compounds from their ores or other subterranean formations containing such mineral values by treatment in situ by pumping highly carbonated water or carbon dioxide and water under pressure down through a well into the uranium bearing strata or other mineral containing strata where decomposition of the mineral or strata can be effected by the carbonated water to produce a solution or suspension of the mineral values in the medium used, and then raising the solution or suspension of the desired components via an exit well (or an exit channel provided within the injection well) to the surface of the earth. The uranium, vanadium, thorium, etc. salts or other compounds may then be separated from the solution or suspension in any desired way and prepared further for commercial use.

Any strata containing extractible values may be treated in accordance with the present invention including granites and granitic deposits, pegmatites and pegmatitic dikes and other formations and sedimentary deposits including sandstones, oil sands, etc., and uranium deposits of secondary character where for example the mineral values leached from, say, pegmatitic sources have been naturally redeposited in some conveniently located porous sedimentary stratum. Rare earth minerals, such as those of thorium and other fissionable metals, are oftentimes associated with uranium in the deposits referred to above and may be recovered along with uranium and/or alkaline earth compounds. Similar considerations apply particularly to vanadium found in uranium or other deposits. In general, it may be said that minerals of uranium frequently occur in the highly siliceous rocks indicated above as in granites and sedimentary sandstones, generally in the quadrivalent and sexivalent forms, and may be recovered by the present invention. Also, it is found with the silicates, phosphates and zirconates of the rare earths and with columbium, tantalum and thorium. Pitchblende, an amorphous compound of uranium, frequently occurring with sulfide minerals and other uranium minerals such as uranite containing for example 40 to 90% $U_3O_8$ (i.e. $UO_2 \cdot 2UO_3$), and often associated with calcium, thorium, iron, bismuth, copper and zinc; and carnotite, $K_2O \cdot 2UO_3 \cdot V_2O_5 \cdot H_2O$; also should be mentioned. Any of these rocks and minerals may be treated in accordance with the present invention to recover the mineral values desired, particularly uranium, vanadium and/or thorium and/or rare earths; and will also result in recovery usually of the associated mineral values such as iron, bismuth, copper and zinc, or binary or ternary combinations.

It is thus possible to lixiviate the uranium and/or vanadium and/or thorium or other values as well as other minerals from sands and other formations containing such mineral values, by carbonated water and particularly when alkali earths are present, especially when present as carbonates or other derivatives which form bicarbonates with carbon dioxide in the presence of water. Such action is enhanced by the presence of hydrocarbons such as petroleum or other hydrocarbonaceous materials present naturally in subterranean strata from which the uranium and/or vanadium and/or other compounds are to be recovered, or introduced artificially for that purpose.

It should be noted that the solubility of petroleum or other hydrocarbonaceous materials is greatly enhanced in carbonated water under pressure and particularly at pressures greater than about 600 p.s.i. at and above which point a critical change in solubility in carbonated water takes place with unexpectedly great increase in solubility. Hence at pressures above about 600 p.s.i. the effects of carbonated water in lixiviation of uranium and/or vanadium and/or thorium and/or rare earth compounds in the presence of petroleum or other hydrocarbonaceous materials leads to greater recoveries of the desired mineral values than is otherwise possible. Effluent waters produced by flooding subterranean strata with carbonated water, particularly from strata containing petroleum, is thus a valuable source for recovery of uranium and/or vanadium and/or thorium and/or rare earth salts or other compounds that would otherwise be lost or remain in the formation in inaccessible condition. And once the uranium and/or vanadium and/or thorium and/or rare earth values are obtained in water soluble condition, they may be dissolved out from the water solution by petroleum, its fractions and distillates, and by other hydrocarbons.

Since uranium is more soluble in alkali bicarbonates, and uranium salts of organic acids are fairly soluble in water, the formation of alkali earth bicarbonates in large quantities and organic acids in lesser amounts when carbonated water is passed through an oil sand, (the presence of such compounds) may explain the recoveries obtained by the present process. But the invention is not to be limited by any theoretical explanations.

In cases where the formation undergoing treatment contains little if any petroleum or hydrocarbonaceous material, the carbonated water introduced may serve as a vehicle to carry such hydrocarbonaceous material into the formation. Thus a petroleum fraction in any desired amount may be added to the carbonated water used for lixiviation of the mineral values. More desirably the treatment in situ is carried out on hydrocarbonaceous strata containing desired uranium and/or vanadium and/ or thorium and/or rare earth values or on strata having such values which strata are contiguous to petroleum or other hydrocarbonaceous deposits.

The recovery of the mineral values particularly uranium and/or vanadium and/or thorium and/or rare earth compounds will depend on a variety of factors. Since the carbonated water may be employed at relatively high pressures, the pressures, the percent of carbonation may be controlled and a much higher concentration of $CO_2$ in the medium thus obtained. In some cases, it will thus be possible to produce bicarbonates or other compounds that would not form at lower pressures or at lower concentrations of carbon dioxide. In such cases, release of pressure will result in decomposition of such derivatives with resultant precipitation of a part at least of the mineral values desired. So that a release of pressure may constitute a first step in the recovery of the mineral values such as uranium and/or vanadium and/or thorium and/or rare earth compounds. And in fact with some derivatives, such precipitated material may have a higher concentration of the desired mineral values than the residual materials remaining in solution.

Other methods of recovery of the mineral values may be used either by and of themselves or in connection with the release-of-pressure step above. Let us consider in this connection by way of illustration only, an equilibrium involved in the precipitation of alkaline earth bicarbonates from solution, as in the following process:

$$Ba(HCO_3)_2 \rightleftharpoons BaCO_3 + CO_2 + H_2O$$

Any factor which will drive this equilibrium to the right will be useful for recovery of the alkaline earth compounds and associated uranium and/or vanadium and/or thorium and/or rare earth compounds. For example, alkalizing the solution or alkaline earth bicarbonates, by the addition of lime (CaO) causes precipitation of the bicarbonates as carbonates through combination and removal of $CO_2$. Advantage is taken of such methods because it has been found than the uranium and/or vanadium and/or thorium and/or rare earth values are carried down in very substantial amounts with the precipitates or as insoluble or partly insoluble material.

Other means for precipitating said compounds are available, as for example aeration where $CO_2$ and $H_2O$ may be removed, as by spraying in a pond. In addition, driving off gaseous $CO_2$ may be used for precipitating the said compounds, for example by heating, release of pressure, allowing the solution to stand, etc. Such means are by way of illustration and are not intended to limit in any way.

It has been found useful under some circumstances to introduce surface active agents desirably with carbonated water into the subterranean strata to give improved recovery of alkaline earth compounds bearing uranium and/or vanadium and/or other values. The surface active agent may be introduced prior to the carbonated water and the latter used as the drive, or intermitten introduction of the materials may be employed, or they may be introduced in repetitive alternation. The surface active agents may be used in solution, suspension or dispersion, and the medium may contain aqueous liquid adjuvants. A solution of the surface active agent in the carbonated water is an economically feasible method to employ that is particularly useful. Such solution may contain substances which modify the solubility of carbon dioxide in the vehicle.

A number of different types of surface active agents may be employed, particularly those soluble in a medium present such as water soluble, oil soluble, soluble in water+$CO_2$, etc. They may be non-ionic, cationic or anionic depending on the conditions of use. The amount of surface active agent which is introduced into the strata or formation may vary within wide limits, and the wide ranges of solubility of such agents in water for example, enables a wide selection of proportions to be made. However as a matter of economy, there is little need generally to use other than relatively small amounts of a surface active agent as for example from a few thousandths of a precent up to higher amounts. Upper ratios may be 1% or 2% and higher, but are unnecessary as a general rule since small fractions of a percent are all that generally need ever be used. 0.005% to 0.5% in water solution may be cited as a typical ratio, all percentages being by weight. Regardless of how it is introduced the effect sought is that obtainable with an amount of from 0.005%–0.5%. The concentration of wetting agent may be stated in a different manner as not less than one part per million basd on the carbonated water injected. There is not particular upper limit except from the standpoint of economy. From one or two parts per million up to five thousand parts per million, based on the carbonated water injected, are satisfactory limits. Such ratios of surface active agent may for example be used in carbonated water solution, and may if desired contain substances which affect the solubility of carbon dioxide.

The products recovered from subterranean strata by the methods set forth herein are new types of products in that they are highly carbonated aqueous solutions containing uranium and/or vanadium and/or thorium and/or other rare earth compounds in amounts greater than are possible in the absence of highly carbonated water. This is particularly true as to such compositions where petroleum or fractions thereof, or other hydrocarbonaceous material is present. Where such hydrocarbons are present, upon release of carbon dioxide not only is there precipitation of inorganic substances but also organic components. The latter may be separated from the mineral values in any desired way for example by organic liquid solvents in which the hydrocarbons are soluble. Liquid chlorinated hydrocarbons are particularly effective for this purpose. Or the inorganic and organic composites may be subjected to high temperatures sufficient to distill out the hydrocarbons, or to oxidation to burn them and simultaneously oxidize the mineral values thus converting uranium and/or vanadium and/or thorium and/or other rare earth values into better condition for recovery.

Where the inorganic materials are substantially soluble in aqueous media even in the absence of substantial amounts of carbon dioxide, release of the latter will result in precipitation of the hydrocarbons while retaining the desired mineral values wholly or substantially in solution. In this way, an initial separation or beneficiation will be accomplished.

In utilizing carbonated water or carbon dioxide with water in carrying out the processes of the present invention, the following conditions should be considered. The amount of carbon dioxide employed is desirably that which will give from 20% to 100% carbonation of any liquid in the strata undergoing treatment. The amount of carbon dioxide which can dissolve in water is dependent on temperature, the purity or content in extraneous matter, and the partial pressure of carbon dioxide. However, in using carbonated water as a water flood for oil reservoirs, it can be stated, as a generalization, that the maximum, or 100% carbonation is about 30 volumes of $CO_2$ per volume of water; thus 80% carbonation is equivalent to 24 vols. $CO_2$/vol. $H_2O$, 50% is 15:1 and 20% 6:1. Under field conditions, volumes may differ from the stated percentage equivalents and under such conditions the higher volumetric concentration is best applied.

Below 20% carbonation, rates of recovery may decrease rapidly as a general rule depending upon the nature of the strata and other conditions. Within the critical concentrations of about 20% to 100% carbonation, the rate of recovery increases with increase of percent carbonation. Preferably, a range of about 50% carbonation (15:1 volume ratio of $CO_2$ to water) to 80% carbonation (24:1) is used but there is no disadvantage in using complete saturation under oil reservoir conditions.

The considerations given above apply to both carbonated water and to carbonated brine or other carbonated aqueous media containing substances which affect the recoveries. And these controls apply also to treatment of non-hydrocarbon containing strata as well as to processes carried out in areas where there are hydrocarbons present such as oil fields. In the latter instance, it is essential that substantially no carbon dioxide in gas phase pass through the oil reservoir to avoid any topping action on the crude (i.e. removal of light petroleum fractions) resulting in wax precipitation and deposit of heavy petroleum fractions in the interstices of the oil sand, which tend to prevent passage of fluids. To avoid presence of $CO_2$ gas, the water or brine or other media should be carbonated to a critical concentration which will be stable at the reservoir temperature and pressure. Consequently the ratio of $CO_2$ to water should not exceed that in which $CO_2$ will remain in aqueous solution under the conditions of mean reservoir pressures.

Temperatures will generally depend on the particular location and depth of the strata undergoing treatment. Rock pressures vary with the depth of the formation. The larger proportion of reservoirs are being water flooded at minimum reservoir pressures of about 400 p.s.i. and maximum reservoir pressures in excess of 3000 p.s.i. The partial pressures of the carbon dioxide in the formation are important and are usually found to be critical. Criticality depends on the type of compounds being lixiviated and the conditions of operation. When operations are carried out in the presence of hydrocarbonaceous strata as in oil fields, a critical minimum for carbon dioxide partial pressure is about 600 p.s.i. since a sudden upturn in petroleum recovery occurs at that point and continues with increasing partial pressures of $CO_2$ although such pressures above about 1000 to 1100 p.s.i. usually give no advantage. Similar critical partial pressure points are found for other operating conditions.

The time required for processing is not a critically important factor, as the distance between an input well and output well is normally more than 100 feet and the time necessary for the treating solution to traverse through 100 feet of structure, such as for example strata of the type met in oil deposits is more than ample to obtain the desired results. In actual practice it takes about 100 days to traverse about 100 feet.

The addition to the critically carbonated water or brine or other media, of appropriate adjuvants including antioxidants and other reducing agents, decrease susceptibility to oxidation but in addition may act to speed up lixivation and extraction. Typical adjuvants of this type include sodium sulfite, hydrogen sulfide, cresol, resorcinol, and other poly phenols, hydroxy-acids including tartaric and citric acids, etc., and their salts, particularly water soluble salts. Other types of adjuvants used conjointly with the above, or by themselves include hydrocarbon gases such as methane, and other aliphatic hydrocarbon gases such as natural gas, which are particularly desirable where viscous hydrocarbonaceous material such as more viscous crude petroleum is present. $CO_2$ has been found to be more reactive with hydrocarbons from methane through decane than with other hydrocarbons.

However, instead of using carbonated water with or without hydrocarbons, an aqueous solution of carbon dioxide including a light hydrocarbon is a beneficial lixiviating agent. The term "light hydrocarbon" is used to cover any low boiling fractions (B.P. below about 350° C.) of petroleum which are liquid under the temperature-pressure conditions in the stratum undergoing treatment. They may be of any type such as paraffinic, naphthenic, aromatic, etc., or mixtures of any of such hydrocarbons. And the treatment with carbonated water or brine or other media or with water or brine or other media in the presence of carbon dioxide is then conducted in the presence of the stated hydrocarbon or hydrocarbons introduced in admixture or separately.

The amounts of hydrocarbons utilized with the carbonated media may vary within substantial limits, and may vary with the nature of the hydrocarbon or mixed hydrocarbons. Where the hydrocarbon is predominantly methane, the ratios may be such that as gases themselves, the ratio of partial pressure of $CO_2$ to gas predominantly methane is from about 2:1 to 0.1:1, while the amount of $CO_2$ is sufficient to give from 20% to 100% saturation of the carbonated water or brine or other medium as explained above. Preferred ratios of $CO_2$ to gas predominantly methane are from 1.5:1 to 1:1. Where the gaseous hydrocarbons are predominantly of from 2 to 4 carbon atoms such as ethane, propanes, butanes, ethylene, propylene, and acetylene, or mixtures thereof the ratios of partial pressure of $CO_2$ to hydrocarbon predominantly 2 to 4 carbon atoms is from about 2:1 to 0.1:1 and preferably between 1.5:1 to 1:1, while the amount of $CO_2$ will be that required to give from about 20% to 100% carbonation in the medium used.

Where liquid hydrocarbons are present, the amount of $CO_2$ may be controlled with respect to the $CO_2$:hydrocarbon ratio in the reservoir. Overall ratios are from about 1:1 to 150:1 by volume equivalent under average field conditions to about ⅓ of a hydrocarbon pore volume to 50 pore volumes of injected $CO_2$. A preferred lower ratio is about 7:1 while the ratio can vary from about 10:1 to 140:1 equivalent to about 3⅓ to 46⅔ hydrocarbon pore volumes and from 50:1 to 135:1 equivalent to about 16⅔ to 45 hydrocarbon pore volumes.

The following examples will illustrate the invention, parts being by weight unless otherwise indicated. The deposit treated according to the following examples is one of the commercial deposits in the Colorado plateau area including western Colorado and eastern Utah, where the mineral occurs as carnotite $K_2O \cdot 2UO_3 \cdot V_2O_5 \cdot 3H_2O$ and in other forms. It is treated as follows:

I

Carbonated water is passed into the strata to give 50 to 60% saturation of $CO_2$ in the liquid in the stratum, the partial pressure of the $CO_2$ being about 800 p.s.i.; and the introduction of the carbonated water is continued for at least three months and then as long as the effluent shows the presence of substantial amounts of uranium values usually also including vanadium compounds. The products obtained may then be worked up as desired. For example, the solution obtained is made alkaline by the addition of lime to precipitate carbonates and the latter carrying uranium values separated, or otherwise worked up by known procedures.

II

Carbonated water is passed into the strata together with natural gas, the carbonated water giving about 80% saturation of $CO_2$ in the liquid of the stratum, the partial pressure of the $CO_2$ being about 650 p.s.i. and the partial pressure of $CO_2$ to methane being about 1.5:1. The introduction is continued until effluent liquid is obtained containing about .5% of uranium as $UO_3$, and continued for six months longer. The liquid product is worked for recovery of uranium values as set forth in Example I. The gaseous effluent may be recirculated with new quantities of carbonated water.

III

Carbonated water together with ethane is passed into a uranium mineral strata which also includes an adjacent oil sand. The ratios of $CO_2$ and water in the carbonated water are introduced to give 60% saturation of $CO_2$ in the liquid in the strata, the partial pressure of the $CO_2$ being about 700 p.s.i. and the ratio of partial pressures of $CO_2$ to ethane being 1:1. The process was continued as in Example II.

The liquid effluent separated into two layers, one being predominantly aqueous, and the other hydrocarbon, with the uranium values concentrated in the latter. Both liquid fractions may be worked up by known procedures to recover the uranium values which include vanadium compounds, and the hydrocarbon layer further treated to recover the hydrocarbons. $CO_2$ and other gases including ethane or the latter alone may be recovered from the gaseous effluent, treated to separate unsaturates in whole or in part, and recycled if desired, or the entire gaseous effluent or any part thereof may be recycled.

Having thus set forth my invention, I claim:

1. The method of recovering uranium and vanadium from natural alkaline earth compounds of uranium and vanadium by lixiviating in situ oil bearing subterranean strata containing such naturally occurring compounds and connate water, in the presence of bicarbonates, with carbon dioxide dissolved in water under pressure to produce from 20% to 100% carbonation of liquid in the stratum and releasing no gaseous $CO_2$ in the formation, and concentrations of alkaline earth bicarbonates greater than those normally present, and recovering any of said uranium and vanadium from alkaline earth bicarbonates by precipitation of alkaline earth carbonates containing said values.

2. The method of claim 1 in which the precipitation is by alkalizing.

3. The method of claim 1 in which precipitation is by driving off gaseous $CO_2$.

4. The method for recovering uranium and vanadium from natural alkaline earth compounds containing them by lixiviating oil bearing subterranean strata containing such naturally occurring compounds and connate water with carbon dioxide dissolved in water under pressure, to produce from about 20% to 100% carbonation in the liquid in the stratum, in the presence of alkaline earth bicarbonates.

5. The method of claim 4 in which a wetting agent is in solution in the water solution of carbon dioxide.

6. The method of recovering uranium and vanadium from subterranean formations, comprising the steps of providing an aqueous solution of carbon dioxide under pressure, lixiviating in situ the subterranean formation containing naturally occurring compounds of uranium and vanadium with said pressurized solution and withdrawing the lixivium from the formation.

7. In the method of claim 6, the additional step of admixing hydrocarbons, gases at normal temperatures and pressures, with said solution wherein the partial pressures of carbon dioxide to hydrocarbons being in ratios of about 2:1 to 0.1:1 and the carbon dioxide is present in amounts to provide 20% to 100% saturation in the liquids of the formation.

References Cited in the file of this patent

UNITED STATES PATENTS

| | | |
|---|---|---|
| 565,342 | Frasch | Aug. 4, 1896 |
| 1,636,455 | Blumenberg | July 19, 1927 |
| 2,563,623 | Scott | Aug. 7, 1951 |
| 2,630,369 | Burwell | Mar. 3, 1953 |
| 2,818,240 | Livingston | Dec. 31, 1957 |

OTHER REFERENCES

Peele: Mining Engineers' Handbook, vol. I, 3d ed., John Wiley & Sons (1941); pp. 10–398 to 10–401.

Holmes: General Chemistry, 5th ed., Macmillan Co. (1949), p. 438.

Atomic Energy Commission Document ACCO–48 June 18, 1954 (Date declassified Sept. 23, 1955) pages 6 and 16–21, 31, 32. The dates of the bibliography reference numbers 107–118 on pages 31 and 32 are relied on.

AEC Document ACCO–36 Oct. 15, 1953. (Date declassified Sept. 23, 1955). Pages 7–10, 21, 22, 26, 27 and 31–33.